(12) United States Patent
Del Carpio Vega et al.

(10) Patent No.: US 10,623,145 B2
(45) Date of Patent: Apr. 14, 2020

(54) NETWORK NODE, WIRELESS DEVICE AND METHODS PERFORMED THEREBY FOR THE NETWORK NODE TO PROVIDE INFORMATION TO THE WIRELESS DEVICE

(71) Applicant: Telefonaktiebolaget LM Ericsson (publ), Stockholm (SE)

(72) Inventors: Luis Felipe Del Carpio Vega, Espoo (FI); Jaime Jiménez, Helsinki (FI); Edgar Ramos, Kirkkonummi (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 114 days.

(21) Appl. No.: 15/747,819

(22) PCT Filed: Oct. 9, 2015

(86) PCT No.: PCT/SE2015/051077
§ 371 (c)(1),
(2) Date: Jan. 26, 2018

(87) PCT Pub. No.: WO2017/061916
PCT Pub. Date: Apr. 13, 2017

(65) Prior Publication Data
US 2018/0219646 A1  Aug. 2, 2018

(51) Int. Cl.
*H04L 1/16* (2006.01)
*H04W 48/12* (2009.01)
(Continued)

(52) U.S. Cl.
CPC .......... *H04L 1/1607* (2013.01); *H04L 5/0055* (2013.01); *H04W 48/10* (2013.01); *H04W 48/12* (2013.01); *H04W 72/042* (2013.01)

(58) Field of Classification Search
CPC .......... H04L 1/16; H04W 72/04; H04W 48/10
See application file for complete search history.

(56) References Cited

U.S. PATENT DOCUMENTS 6,098,110 A * 8/2000 Witkowski ............ H04L 49/351
370/412
6,628,946 B1  9/2003 Wiberg et al.
(Continued)

FOREIGN PATENT DOCUMENTS

EP  1460791 A2  9/2004
EP  2663007 A1  11/2013
(Continued)

OTHER PUBLICATIONS

Dutta, Aveek et al., "SMACK—A SMart ACKnowledgment Scheme for Broadcast Messages in Wireless Networks", SIGCOMM'09, Barcelona, Spain, Aug. 17-21, 2009, 15-26.
(Continued)

*Primary Examiner* — Zhiren Qin
(74) *Attorney, Agent, or Firm* — Sage Patent Group

(57) ABSTRACT

A network node, a wireless device and respective methods performed thereby for the network node to provide information to one or more wireless devices are provided. The network node and the wireless device are operable in a wireless communication network. The method performed by the network node comprises transmitting (120) a first message by means of broadcast indicating that a second message associated with the first message will be broadcasted after the transmission of the first message, the first message also indicating to the one or more wireless devices that feedback with regard to the second message is required should the second message not be received; and transmitting (130) the second message by means of broadcast.

20 Claims, 10 Drawing Sheets

(51) Int. Cl.
*H04L 5/00* (2006.01)
*H04W 48/10* (2009.01)
*H04W 72/04* (2009.01)

(56) References Cited

U.S. PATENT DOCUMENTS

| | | | |
|---|---|---|---|
| 2007/0189207 A1 | 8/2007 | Sammour et al. | |
| 2008/0232389 A1* | 9/2008 | Wu | H04W 72/02 370/436 |
| 2010/0098073 A1* | 4/2010 | Tanaka | H04L 12/4625 370/389 |
| 2010/0173641 A1* | 7/2010 | Kim | H04W 72/0446 455/450 |
| 2012/0140743 A1 | 6/2012 | Pelletier et al. | |
| 2012/0170495 A1* | 7/2012 | Zhou | H04W 76/10 370/310 |
| 2012/0230322 A1* | 9/2012 | Wiatrowski | H04B 7/2643 370/347 |
| 2014/0018031 A1* | 1/2014 | Ode | H04W 4/90 455/404.1 |
| 2014/0226576 A1* | 8/2014 | Gupta | H04W 56/00 370/329 |
| 2015/0043414 A1* | 2/2015 | Han | H04W 72/005 370/312 |
| 2015/0236770 A1* | 8/2015 | Garrett | H04B 7/0452 370/329 |
| 2016/0050271 A1* | 2/2016 | Tohzaka | H04L 67/1095 709/248 |
| 2016/0352454 A1* | 12/2016 | Zhang | H04L 1/0003 |

FOREIGN PATENT DOCUMENTS

| | | |
|---|---|---|
| WO | 2005046125 A1 | 5/2005 |
| WO | 2008021573 A2 | 2/2008 |
| WO | 2014070548 A1 | 5/2014 |
| WO | 2015043778 A1 | 4/2015 |

OTHER PUBLICATIONS

Lu, Cheng-Chung et al., "NACK-based Retransmission Schemes for MBMS over Single Frequency Network in LTE", 6th International ICST Conference on Communications and Networking in China (CHINACOM), IEEE, 2011, 284-288.

Park, Seung Young et al., "Hybrid ARQ Protocol for Multi-Antenna Multicasting Using a Common Feedback Channel", IEEE Transactions on Communications, vol. 59, No. 6, Jun. 2011, 1530-1542.

Sheu, Shiann-Tsong et al., "A Highly Reliable Broadcast Scheme for IEE 802.11 Multi-hop Ad Hoc Networks", IEEE, 2002, 610-615.

Xu, X. Rex et al., "Resilient Multicast Support for Continuous-Media Applications", Network and Operating System Support for Digital Audio and Video, Proceedings of the IEEE 7th International Workshop on St. Louis, MO, May 19-21, 1997, 183-194.

\* cited by examiner

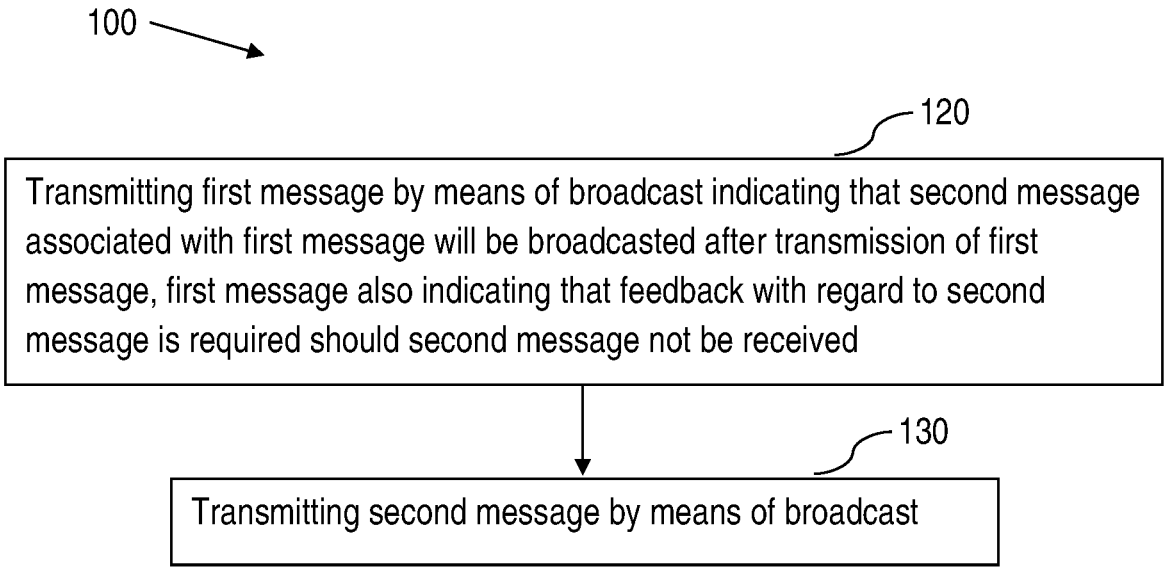

NETWORK NODE, WIRELESS DEVICE AND METHODS PERFORMED THEREBY FOR THE NETWORK NODE TO PROVIDE INFORMATION TO THE WIRELESS DEVICE

TECHNICAL FIELD

The present disclosure relates to wireless communication and in particular to providing information from the network node to the wireless device by means of broadcast.

BACKGROUND

A broadcast message is useful to deliver the same message to multiple entities in a shorter time than delivering the message to each device independently. A broadcast message should be understood as intended to all entities able to understand the message. A multicast message is intended to subset of entities able to understand the message.

In a communication system, usually the reception of broadcast or multicast transmissions is not acknowledged. This avoids for example flooding of acknowledgements in the network after a broadcast transmission. Example of this are different wireless systems such as Wireless Local Area Network, WLAN, 802.11 where broadcast/multicast signals at Media Access Control, MAC, and Physical, PHY, layers are not acknowledged, also Layer 3, L3, Internet Protocol, IP, multicast packets are not acknowledged, and also Constrained Application Protocol, CoAP, group communication messages are not acknowledged. For this reason, broadcast/multicast transmissions are considered not reliable

SUMMARY

The object is to obviate at least some of the problems outlined above. In particular, it is an object to provide a network node, a wireless device and respective methods performed thereby for the network node to provide information to one or more wireless devices. These objects and others may be obtained by providing a network node and a wireless device; and a respective method performed by a network node and a wireless device according to the independent claims attached below.

According to an aspect a method performed by a network node for providing information to one or more wireless devices, the network node and the wireless device(s) being operable in a wireless communication network is provided. The method comprises transmitting a first message by means of broadcast indicating that a second message associated with the first message will be broadcasted after the transmission of the first message, the first message also indicating to the one or more wireless devices that feedback with regard to the second message is required should the second message not be received; and transmitting the second message by means of broadcast.

According to an aspect a method performed by a wireless device for receiving information from a network node, wherein the network node and the wireless device being operable in a wireless communication network is provided. The method comprises receiving, from the network node, a first message by means of broadcast indicating that a second message associated with the first message will be broadcasted after the transmission of the first message, the first message also indicating to the wireless device that feedback with regard to the second message is required should the second message not be received. The method further comprises starting a timer, and when the timer expires before the second message is received, transmitting, to the network node, a negative acknowledgement, NACK.

According to an aspect a network node for providing information to one or more wireless devices, the network node and the wireless device(s) being operable in a wireless communication network is provided. The network node is configured for transmitting a first message by means of broadcast indicating that a second message associated with the first message will be broadcasted after the transmission of the first message, the first message also indicating to the one or more wireless devices that feedback with regard to the second message is required should the second message not be received; and for transmitting the second message by means of broadcast.

According to an aspect a wireless device for receiving information from a network node, wherein the network node and the wireless device being operable in a wireless communication network is provided. The wireless device is configured for receiving, from the network node, a first message by means of broadcast indicating that a second message associated with the first message will be broadcasted after the transmission of the first message, the first message also indicating to the wireless device that feedback with regard to the second message is required should the second message not be received. The wireless device is further configured for starting a timer, and when the timer expires before the second message is received, transmitting, to the network node, a negative acknowledgement, NACK.

The method performed by the network node, the method performed by the wireless device and the network node and the wireless device have the same possible advantages. One possible advantage is that the reliability of broadcast message is increased using negative-acknowledgement messages instead of positive-acknowledgements. Another possible advantage is that the contention between positive-acknowledging devices, the total time spent in acknowledgment transmissions and radio planning for effective positive acknowledgments may be reduced. This may be especially useful when the broadcast group is quite large and the number of positive acknowledgments to be received is particularly larger than the number of negative acknowledgments. Still a possible advantage is that having negative acknowledgment instead of positive acknowledgment saves energy, reduces possible interference due to the simultaneous access in mediums where contention based access techniques are used and therefore reduces the latency in contention based systems by not increasing the medium occupancy. Further, positive acknowledgments activate processes in wireless devices that have decoded the message correctly but may not need to perform further actions which thus may be avoided.

BRIEF DESCRIPTION OF DRAWINGS

Embodiments will now be described in more detail in relation to the accompanying drawings, in which:

FIG. 1a is a flowchart of a method performed by a network node for providing information to one or more wireless devices, according to an exemplifying embodiment.

FIG. 1b is a flowchart of a method performed by a network node for providing information to one or more wireless devices, according to another exemplifying embodiment.

DETAILED DESCRIPTION

Figure 1C:
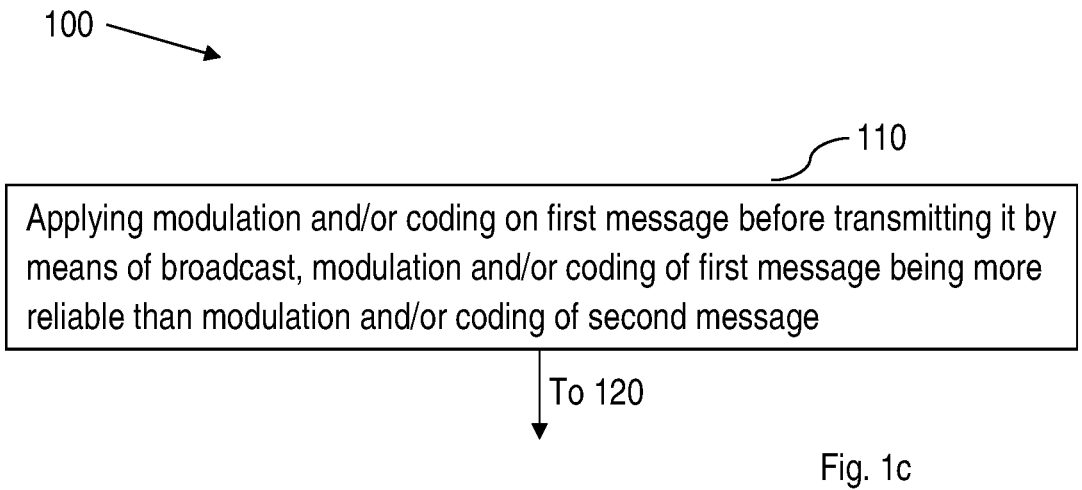
FIG. 1c is a flowchart of a method performed by a network node for providing information to one or more wireless devices, according to yet an exemplifying embodiment.

Briefly described, a network node, a wireless device and respective methods performed thereby for the network node to provide information to one or more wireless devices are provided. The network node wants to be sure that those wireless devices that is connected to it, is being served by it or that can hear it receives a broadcast message. The broadcast message may be a high priority message and it is herein referred to as a second message that it is transmitted by means of broadcast.

The network node first broadcasts a first message that indicates to the receiving wireless devices that a second message is to be broadcasted. The first message also indicates to the receiving wireless devices that they need to take specific action in case the second message is not received.

The wireless devices may start a timer upon reception of the first broadcasted message. Should the second message not be received by a wireless device once the timer expires, that wireless device may determine that it has failed to receive the second broadcasted message and should then inform the network node of this event so that the network node may take appropriate action(s).

Embodiments herein relate to a method performed by a network node for providing information to one or more wireless devices, the network node and the wireless device(s) being operable in a wireless communication network. Exemplifying embodiments of such a method will now be described with reference to FIGS. 1a-1c.

FIG. 1a illustrates the method 100 comprising transmitting 120 a first message by means of broadcast indicating that a second message associated with the first message will be broadcasted after the transmission of the first message, the first message also indicating to the one or more wireless devices that feedback with regard to the second message is required should the second message not be received; and transmitting 130 the second message by means of broadcast.

The first message serves as in indication to the wireless device that a second message is to be transmitted. The first message is broadcasted and may thus be received by a plurality of wireless devices. The wireless devices are informed by the first message that a second message is soon to be broadcasted as well and that the wireless devices need to be attentive and react if the second message is not received. The first message may be short and carry no further information that just being an indication of that the second message is soon to be broadcasted. Alternatively, the first message may comprise pieces of information as will be described in more detail below. The second message may be of high priority or may comprise important information that the network node wants as many wireless devices as possible to receive. Since the broadcasting procedure does not have a feature of acknowledging the reception of a broadcast message, since that may completely overflow the sender or the radio resources, it is generally not possible for the wireless devices to acknowledge the reception of broadcast messages.

However, by the first message, the wireless devices are informed that it is important that the pay attention that they actually receive the second message. The first message thus informs the wireless device that receives the first message that they need to inform the network node if they do not receive the second message within a time period. The length of the time period will be discussed in more detail below. Once the network node has broadcasted the first message, the network node may then broadcast the second message. In this manner, if any wireless device receives the first message and not the second, that or those wireless device(s) may inform the network node of that fact. If no feedback is received by the network node, the network node may assume that all wireless devices that received the first message also received the second message.

In this disclosure, broadcasting may comprise one transmission to all receivers and/or at least two consecutive transmissions to multiple receivers per multiple transmission.

The method performed by the network node has several possible advantages. One possible advantage is that the reliability of broadcast message is increased using negative-acknowledgement messages instead of positive-acknowledgements. Another possible advantage is that the contention between positive-acknowledging devices, the total time spent in acknowledgment transmissions and radio planning for effective positive acknowledgments may be reduced. This may be especially useful when the broadcast group is quite large and the number of positive acknowledgments to be received is particularly larger than the number of negative acknowledgments. Still a possible advantage is that having negative acknowledgment instead of positive acknowledgment saves energy, reduces possible interference due to the simultaneous access in mediums where contention based access techniques are used and therefore reduces the latency in contention based systems by not increasing the medium occupancy. Further, positive acknowledgments activate processes in wireless devices that have decoded the message correctly but may not need to perform further actions which thus may be avoided.

The method 100 may further comprise, as illustrated in FIG. 1b, receiving 140 a negative acknowledgement, NACK, from at least one wireless device; and re-transmitting 150 the second message to that/those wireless device that transmitted a respective NACK to the network node, the second message being re-transmitted by means of broadcast, multicast or unicast.

In case a wireless device does not receive the second message that was broadcasted by the network node, that wireless device sends a NACK to the network node indicating the failure of receiving the second message. The network node may assume that any wireless device in its coverage area that received the first message but did not send a NACK has successfully received the second broadcasted message.

The network node may then want to make sure that those wireless devices that sent a NACK and thus failed to receive the second broadcasted message indeed will receive the information comprised in the second message. The network node may thus either broadcast the message again, or it may send the second message by means of multicast to those wireless devices that sent a NACK. Another option is to transmit the second message by means of unicast to those wireless devices that sent a NACK. In this manner, the network node may provide a plurality of wireless devices with information in quite a reliable way, without being drowned in a big amount of acknowledgements, ACKs, and without causing excessive resource usage by the wireless devices sending ACKs. It is relatively safe to assume that in the general case, it is more likely that most wireless devices actually successfully will receive a broadcast message than that most wireless devices will fail to receive the broadcast message.

Still further, the method may comprise, as illustrated in FIG. 1c, applying 110 a modulation and/or coding on the first message before it is transmitted by means of broadcast to the one or more wireless devices, the modulation and/or coding of the first message being more reliable than the modulation and/or coding of the second message.

In order to make sure that the first message is successfully received, the network node may apply a modulation and/or coding on the first message before it is transmitted by means of broadcast to the one or more wireless devices. This is to attempt to maximise the likelihood of the first message being received. Depending on different circumstances such as interference, pathloss, distance between a wireless device and the network node, etc. different coding and modulation may be performed in order to enhance the performance of the communication between the network node and the wireless devices in its coverage area being served by, or connected to, the network node.

Applying a modulation and/or coding on the first message before it is transmitted, wherein the modulation and/or coding of the first message being more reliable than the modulation and/or coding of the second message, the probability that the first message will be successfully received by the wireless devices is increased. Therefore it may be relatively safe to assume that all (or close to all) wireless devices will successfully receive the first message. However, since the second message is generally longer, comprises more information and is modulated and/or coded using a less reliable modulation and/or coding than the first message, it is not as likely that the second message will be successfully received.

However, should any wireless device fail to receive the second broadcasted message, that wireless device may in such a case send a NACK to the network node in order for the network node to re-transmit the second message to that wireless device by means of broadcast, multicast or unicast.

The first message may comprise an indication of a length of a timer to be applied by the one or more wireless devices.

The wireless device may not know how long it should wait for the second message until it may decide that it has not been received. The network node may wait a period of time between the transmission of the first message and the transmission of the second message. The period of time may vary or may always be the same. As stated above, the first message may serve only as an indication, or it may comprise some piece of information, such as the length of the timer to be applied by the one or more wireless devices.

The reason for wanting to keep the first message "small", i.e. comprising as little information as possible is that it may increase its probability to be successfully received by the wireless devices. In the case that the first message does not comprise an indication of the length of the timer to be applied by the one or more wireless devices, the wireless devices may be preconfigured to always wait a certain time between the reception of the first message and until deciding that the second message is not received. By being preconfigured to wait a certain time is meant that the length of the timer is preconfigured in the wireless device or being received in a system information block when the wireless device attaches or connects to the network node.

The wireless communication network may be based on one of the following technologies, WiFi, Orthogonal Frequency Multiplexing, OFDM, Code Division Multiple Access, CDMA, and Time Division Multiple Access, TDMA.

There is a plurality of different wireless communication techniques available. Irrespective of the type of technique, the method is applicable to any wireless communication system supporting a broadcast procedure.

Most communication techniques supports a dedicated broadcast channel or support broadcast procedure on channels that are used for downlink communication without being dedicated broadcast channels.

In an example, the second broadcast message comprises a command to be executed by the receiving wireless device (s).

By receiving a command by means of the second broadcast message, the network node may control the wireless devices. Merely as an illustrative example, the wireless device may be connected to a lamp, to a sensor, to an actuator of some kind, to a vending machine, loudspeaker etc., wherein the command may be to switch on/off, to change price of a merchandise of the vending machine, to increase or lower the volume, to play a message on the loudspeaker and so on.

Embodiments herein also relate to a method performed by a wireless device for receiving information from a network node, wherein the network node and the wireless device being operable in a wireless communication network. Exemplifying embodiments of such a method will now be described with reference to FIGS. 2a-2c.

Figure 2A:
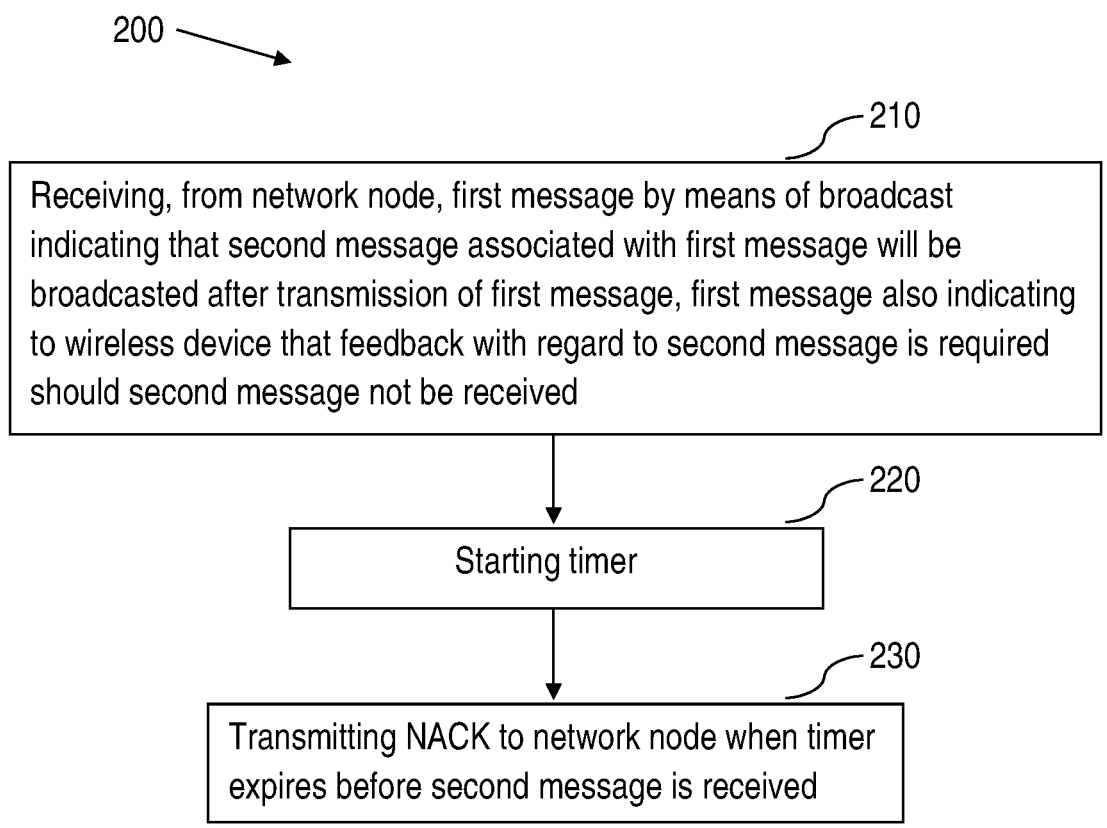
FIG. 2a is a flowchart of a method performed by a wireless device for receiving information from a network node, according to an exemplifying embodiment.

FIG. 2a illustrates the method 200 comprising receiving 210, from the network node, a first message by means of broadcast indicating that a second message associated with the first message will be broadcasted after the transmission of the first message, the first message also indicating to the wireless device that feedback with regard to the second message is required should the second message not be received. The method further comprises starting 220 a timer, and when the timer expires before the second message is received, transmitting 230, to the network node, a negative acknowledgement, NACK.

When the wireless device receives the first message by means of broadcast, it becomes aware that the second message will follow shortly and that the wireless device has to take specific actions should the second message not be received. Generally, the wireless device does not indicate to the network node that is has received, or failed to receive, a broadcasted message. However, this specific first message associated with the second message informs the wireless device that it has to deviate from the general procedure or behaviour for the broadcast procedure. In order for the wireless device to be able to determine that it has not received the second message within a certain time period, the wireless device starts the timer. The timer generally has a length that is well adapted to the time period between the broadcast transmission of the first message and the broadcast transmission of the second message. Consequently, when the timer expires, the wireless device can be sure that the network node has indeed broadcasted the second message.

If the timer should expire and the wireless device has not received the second message by means of broadcast, the wireless device may deduce, or determine, that it failed to receive the second message. Consequently, the wireless device may then transmit, or send, the NACK to the network node indicating that the second message was not received by the wireless device.

The method performed by the wireless device has the same possible advantages as the method performed by the network node. One possible advantage is that the reliability of broadcast message is increased using negative-acknowledgement messages instead of positive-acknowledgements. Another possible advantage is that the contention between positive-acknowledging devices, the total time spent in acknowledgment transmissions and radio planning for effective positive acknowledgments may be reduced. This may be especially useful when the broadcast group is quite large and the number of positive acknowledgments to be received is particularly larger than the number of negative acknowledgments. Still a possible advantage is that having negative acknowledgment instead of positive acknowledgment saves energy, reduces possible interference due to the simultaneous access in mediums where contention based access techniques are used and therefore reduces the latency in contention based systems by not increasing the medium occupancy. Further, positive acknowledgments activate processes in wireless devices that have decoded the message correctly but may not need to perform further actions which thus may be avoided.

Figure 2B:
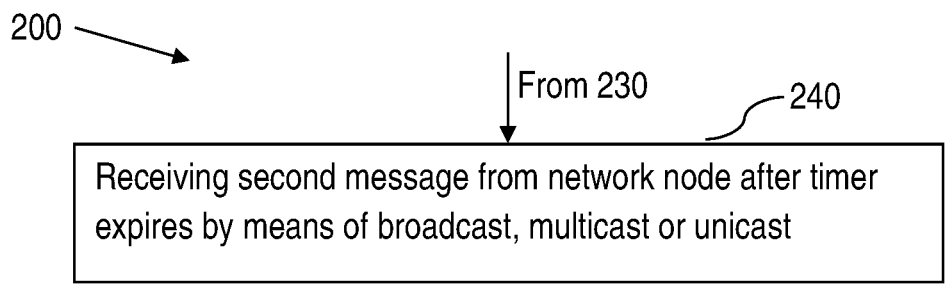
FIG. 2b is a flowchart of a method performed by a wireless device for receiving information from a network node, according to another exemplifying embodiment.

The method may further comprise, as illustrated in FIG. 2b, receiving 240 the second message from the network node after the timer has expired, the second message being received by means of broadcast, multicast or unicast.

In case the second message is not received before the timer expires, the wireless device sends a NACK. This is to enable the network node to retransmit the second message to the wireless device. The second message may be important and requesting the wireless device to inform the network node of the failure to receive it gives the network node an opportunity to retransmit the second message to the wireless device The network node may then retransmit the second message using broadcast, multicast or unicast. It may further be necessary for the wireless device to either transmit an ACK if the second message is received or a NACK if the second message is not received. For a retransmission, it may be permissible to send an ACK since it is likely that a relatively small portion of the total amount of wireless devices failed to receive the second message and the network node is not running a high risk of being drowned in a massive amount of ACKs.

Figure 2C:
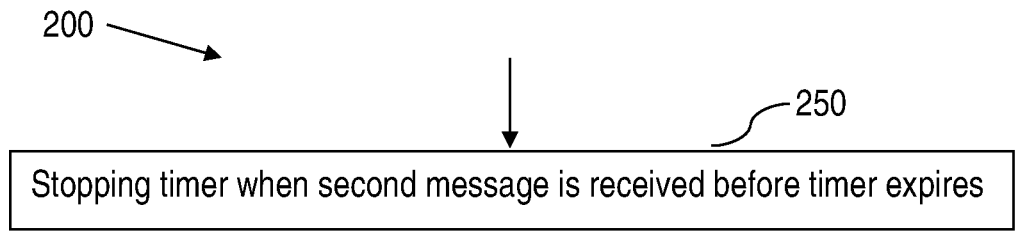
FIG. 2c is a flowchart of a method performed by a wireless device for receiving information from a network node, according to yet an exemplifying embodiment.

The method may still further comprise, as illustrated in FIG. 2c, stopping 250 the timer when the second message is received before the timer expires.

If the second message is received before the timer expires, the wireless device needs not to take any action to acknowledge safe receipt of the second message. Thus, the wireless device may simply just stop the timer. Then the wireless device may have to take certain actions due to the content of the second message as will be explained in more detail below.

Since the first message was modulated or coded in such a manner that it is highly likely to be successfully received by the wireless device, the absence of a NACK is indeed an acknowledgement to the network node that the second message was successfully received.

The first message may comprise an indication of the length of the timer that the wireless device should apply for the timer.

In order for the wireless to know how long it will take for the network node to send the second message, the network node may enclose the indication of the length of the timer in the first message. The wireless device may then just apply that length to the timer and start it. If the timer expires before the second message is received by means of broadcast, the wireless device may be sure that it has failed to successfully receive the second message and may then send the NACK to the network node in order for a retransmission to take place.

Alternatively, the length of the timer may be preconfigured in the wireless device.

In this alternative, the timer would have the same length every time it is started and the preconfigured length of the timer is long enough so that if the timer expires before the second message is received, the wireless device may be sure that it failed to successfully receive the second message and may then send the NACK to the network node in order for a retransmission to take place.

The wireless communication network may be based on one of the following technologies, WiFi, OFDM, CDMA, and TDMA as described above.

Also as described above, the second broadcast message may comprise a command to be executed by the wireless device(s).

The wireless device may in this manner be remotely controlled to execute commands as described above.

Merely as an illustrative example, the wireless devices may be different sensors or apparatuses in a hostile environment where humans should not be present. Then, by means of the broadcast procedure as described herein, a plurality of sensors may be controlled by means of broadcast to perform different actions.

By the first broadcast message transmitted using high reliability coding, the network node indicates to the receiving wireless devices that a subsequent message containing the intended data will be transmitted shortly. Therefore, the devices decoding the initial message will be prepared to decode the next announced message. If the announced message is not received within a time window corresponding to the length of the timer, a negative acknowledgement message, NACK, is sent back to the initial message originator, i.e. the network node. Upon reception of a NACK, the message originator may retransmit the announced message with different transmission characteristics (coding change, several repetitions, unicast transmissions, etc.). The first and second message may be associated by means of time relationship, an identifier, a message identity or by means of the following broadcast message.

The second message might be larger in size than the first message and might have different transmission characteristics (for example could be coded with a different modulation and coding). A lack of positive acknowledgment with regards to the second message indicates to the network node that an entity, e.g. a wireless device, decoded the high-priority broadcast successfully or an entity is completely out of coverage of the high-priority broadcast originator, i.e. the first message. The receiving entities which timer has expired will transmit a NACK to the initial high-priority broadcast originator e.g. a service layer protocol of the network node. This indicates that the high-priority broadcast message was received but the announced message was not received. There may be different protocols involved depending on which technology is used, e.g. WiFi, OFDM, CDMA, or TDMA. The originating entity, e.g. the network node, will retransmit the announced message by means of repeating the announced message or utilising a different strategy such a broadcast message, a multicast message or a unicast messages to deliver the intended second message to every receiving entity that replied with a NACK within the time that the data of the message is still valid.

Below follows an example where the network node is employed in a WiFi network, wherein the network node, which may also be referred to as a transmitting entity or Access Point, AP, comprises a protocol stack composed at least by the IP and CoAP. The wireless devices may be referred to as stations, or STAs. Additionally, in case of management, the STAs or wireless devices could also be Lightweight Machine To Machine, LWM2M, clients and the AP could host a LWM2M Server.

CoAP entities may be pre-set to listen to a specific IP multicast address and they have been assigned an appropriate timeout, i.e. length of the timer. The manager of the entity, e.g. a wireless device or STA, may configure these settings as Objects when using LWM2M. They could also be set to listen for a specific flag (e.g. comprised in the first message) to be in the CoAP Header or they could read from a Resource Directory the existing groups there are and their associated address. A command (or a plain CoAP message) may be sent by the manager (via the network node or AP) at any time using a high-priority broadcast announcement. This message will set a flag on the entities. When this flag is received, a timer will then be activated. For the broadcast transmissions, the AP should use the most robust modulation and coding for the high-priority broadcast message (broadcast announcement), corresponding to the first message described above. The STA/wireless device/entity will wait for a new message, i.e. the second message, that should contain the actual actuation command (e.g. switch lights on). If the timer reaches the timeout and no message has been received then the entity should send back a CoAP Notification (NACK). The actual actuation command may be delivered with a broadcast, multicast or unicast message. If an expected message is received when the flag is active, then the timer is reset. The manager will get only a limited number of notifications (NACK), since the majority of the wireless devices, or entities, will have received the command, only those furthest from the AP or network node may have not receive it. It is the task of the manager then to resend actuation commands to those devices that have sent notification by using the same or a different transmission strategy.

Wireless device are assumed to be in an active mode, which may be named differently depending on the technology used, e.g. connected mode, meaning that in they are prepared to receive transmission(s) from its serving network node.

Generally, the different wireless communication systems/networks support broadcasting, wherein messages may be broadcasted on a broadcast bearer. There may e.g. be a setup of a new bearer named for example reliable broadcast bearer. Packets that are transmitted through this bearer may have been selected for example by the following methods:

a. Packet deep-inspection where the content of the packet is analysed
b. Packets managed through a middle-ware CoAP entity (broker or proxy)
  i. A CoAP Pub/Sub broker or proxy is implemented in a network node or in the Mobility Management Entity, MME, or in other element of a core network,
  ii. To handle better mobility cases, the CoAP Sub/Pub broker may be located in the MME (This option is described further below)

The analysis of the packet could be done either in the edge of the radio network or in the network node, depending on this, a packet water-marking mechanism could be used to help the network node to identify broadcast intended packets.

The broadcast transmission does not require encryption and messages may be transmitted using transparent services. The radio network scheduler may address the packet to the terminals registered for such a bearer in the same transmission or subsequent transmissions.

The reliable broadcast bearer behaves as described herein such that a first message is broadcasted e.g. using a robust coding and/or modulation. From the radio network perspective this message may not have any other meaning than any other transmission, but from the application layer perspective it may indicate that a second message carrying packet to be delivered will be broadcasted after the transmission of the first message and that feedback is required should the second message not be received.

In another example, the first message might have a meaning for the radio network where the wireless device might transmit acknowledgment in MAC level based on the mechanism.

In an exemplifying implementation, the CoAP is intended to be used in systems where one or more nodes are resource constrained, in particular for low power wireless sensor networks. In that context, the dominant type of communication is RESTfull, oriented to endpoint-to-endpoint and stateless. This type of communication however may not be suitable for sending information to multiple devices simultaneously.

Figure 3A:
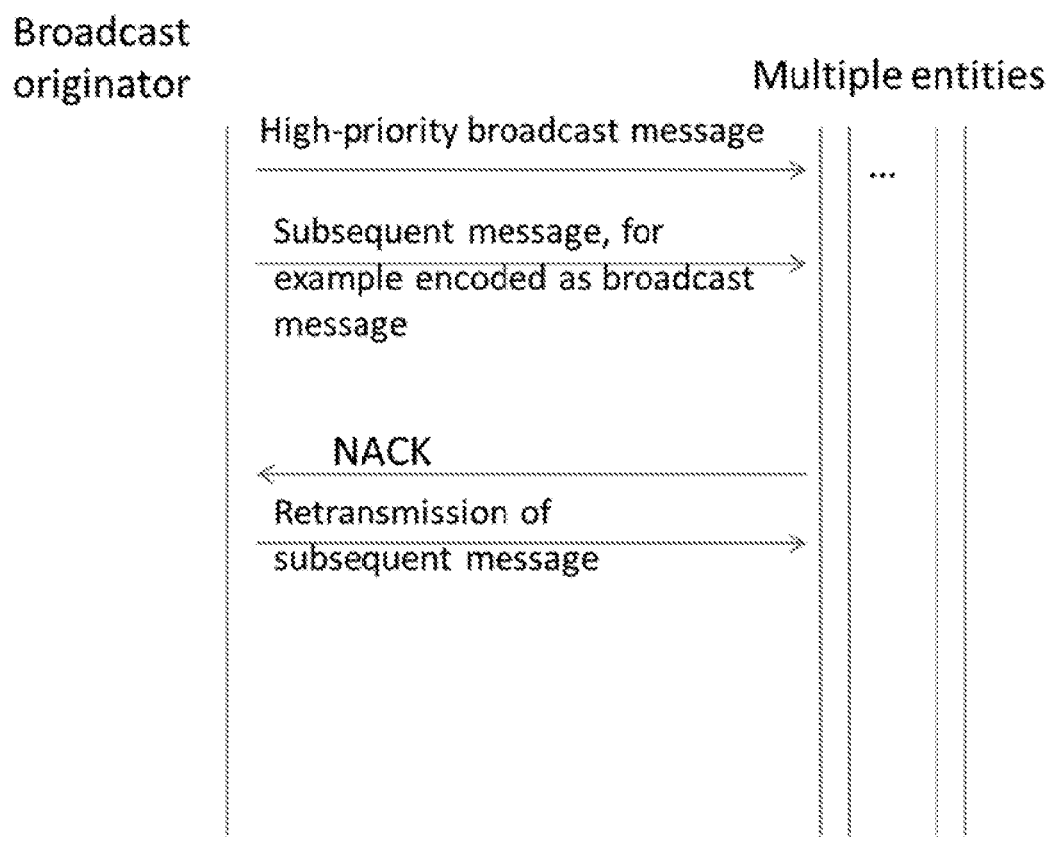
FIG. 3a is a sequence diagram of a first exemplifying communication between a network node and a wireless device.
Figure 3B:
FIG. 3b is a sequence diagram of a second exemplifying communication between a network node and a wireless device.
Figure 3C:
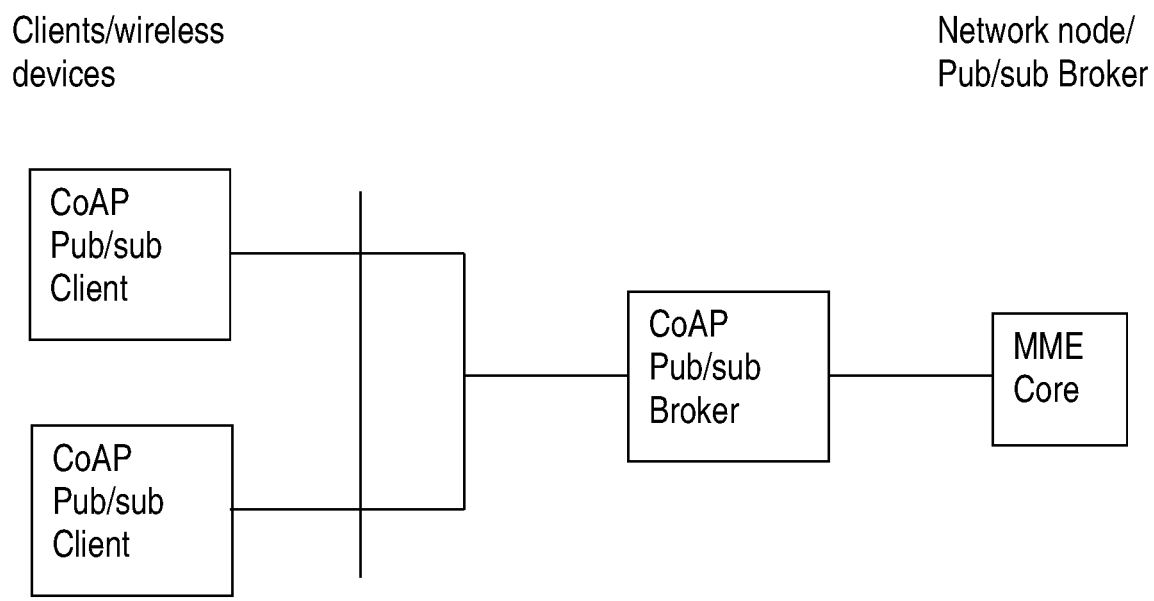
FIG. 3c is an exemplifying architecture of an implementation of CoAP.

An exemplifying architecture is shown in FIG. 3c. The end devices (wireless devices) will be constrained devices with CoAP support. The CoAP Pub/Sub Broker would then be running on a node on the mobile communication system and will have a connection to the $3^{rd}$ Generation Partnership Project, 3GPP, network.

The initial state is for a client to subscribe to a specific topic in the broker, for example a "high priority update" topic in which a first message is broadcasted indicating that a second message will be broadcasted after the transmission of the first message and that feedback is required should the second message not received, this topic is previously created by the MME on the broker running in the network node. The subscription may be made following a standard subscription model, with a GET request message (i.e. GET /ps/topic Observe:0 Token:01").

Figure 3D:
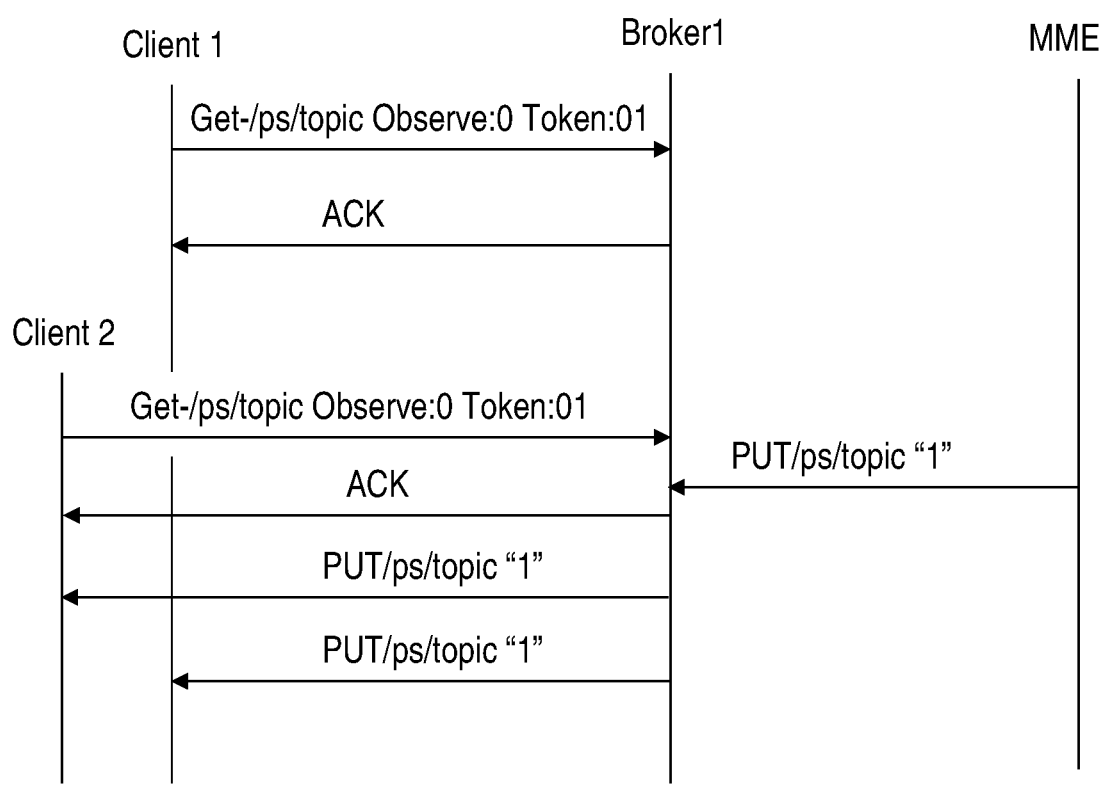
FIG. 3d is an exemplifying signalling in a network according to CoAP.

Once the subscription is established, a manager may then send a publication message to all subscribers whenever it wants to get them to a "ready state". This means CoAP PubSub broker may send a first message indicating that a second message will be broadcasted after the transmission of the first message. The publication message may be a PUT message to the topic with state bit set to 1 "PUT /ps/topic "1"". This publication will be sent to the previously subscribed devices. This process is shown in FIG. 3d. As with the normal usage of the CoAP Pub/Sub Broker, it may require implicit trust on the Broker as the source and destination of information. In CoAP terminology, the Broker becomes the origin endpoint of the communication to the clients.

Embodiments herein also relate to a network node for providing information to one or more wireless devices, the network node and the wireless device(s) being operable in a wireless communication network. Exemplifying embodiments of such a network node will now be described with reference to FIGS. 4 and 5. The network node has the same technical features, objects and advantages as the method performed by the network node. The network node will thus only be described in brief in order to avoid unnecessary repetition.

Figure 4:
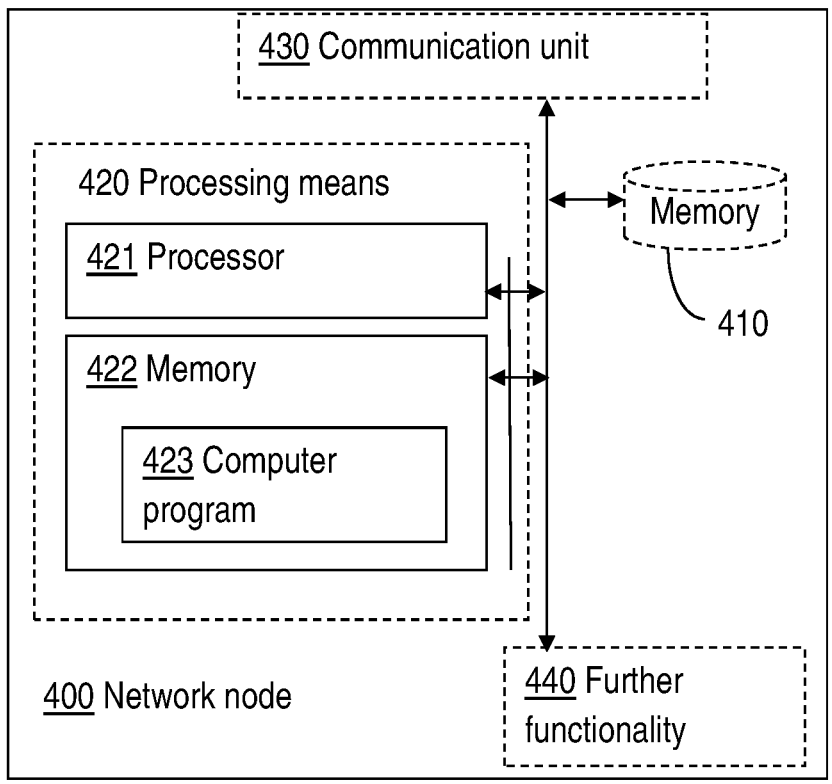
FIG. 4 is a block diagram of a network node for providing information to one or more wireless devices, according to an exemplifying embodiment.
Figure 5:
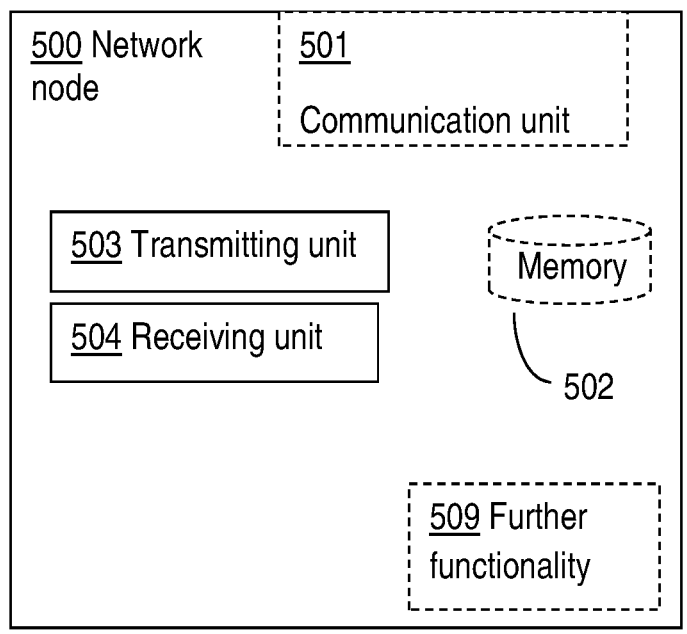
FIG. 5 is a block diagram of a network node for providing information to one or more wireless devices, according to another exemplifying embodiment.

FIGS. 4 and 5 illustrate the network node 400, 500 being configured for transmitting a first message by means of broadcast indicating that a second message associated with the first message will be broadcasted after the transmission of the first message, the first message also indicating to the one or more wireless devices that feedback with regard to the second message is required should the second message not be received; and transmitting the second message by means of broadcast.

The network node may be realised or implemented in various ways. A first exemplifying realisation or implementation is illustrated in FIG. 4. FIG. 4 illustrates the network node 400 comprising a processor 421 and memory 422, the memory comprising instructions, e.g. by means of a computer program 423, which when executed by the processor 421 causes the network node 400 to transmit a first message by means of broadcast indicating that a second message associated with the first message will be broadcasted after the transmission of the first message, the first message also indicating to the one or more wireless devices that feedback with regard to the second message is required should the second message not be received. The memory further comprises instructions, which when executed by the processor 421 causes the network node 400 to transmit the second message by means of broadcast.

FIG. 4 also illustrates the network node 400 comprising a memory 410. It shall be pointed out that FIG. 4 is merely an exemplifying illustration and memory 410 may be optional, be a part of the memory 422 or be a further memory of the network node 400. The memory may for example comprise information relating to the network node 400, to statistics of operation of the network node 400, just to give a couple of illustrating examples. FIG. 4 further illustrates the network node 400 comprising processing means 420, which comprises the memory 422 and the processor 421. Still further, FIG. 4 illustrates the network node 400 comprising a communication unit 430. The communication unit 430 may comprise an interface through which the network node 400 communicates with other nodes or entities of the wireless communication network as well as other communication units. FIG. 4 also illustrates the network node 400 comprising further functionality 440. The further functionality 440 may comprise hardware of software necessary for the network node 400 to perform different tasks that are not disclosed herein.

An alternative exemplifying realisation, or implementation, of the network node is illustrated in FIG. 5. FIG. 5 illustrates the network node 500 comprising a transmitting unit 503 for transmitting a first message by means of broadcast indicating that a second message associated with the first message will be broadcasted after the transmission of the first message, the first message also indicating to the one or more wireless devices that feedback with regard to the second message is required should the second message not be received; and for transmitting the second message by means of broadcast.

In FIG. 5, the network node 500 is also illustrated comprising a communication unit 501. Through this unit, the network node 500 is adapted to communicate with other nodes and/or entities in the WLAN. The communication unit 501 may comprise more than one receiving arrangement. For example, the communication unit 501 may be connected to both a wire and an antenna, by means of which the network node 500 is enabled to communicate with other nodes and/or entities in the wireless communication network. Similarly, the communication unit 501 may comprise more than one transmitting arrangement, which in turn is connected to both a wire and an antenna, by means of which the network node 500 is enabled to communicate with other nodes and/or entities in the wireless communication network. The network node 500 further comprises a memory 502 for storing data. Further, the network node 500 may comprise a control or processing unit (not shown) which in turn is connected to the units 503 and 504. It shall be pointed out that this is merely an illustrative example and the network node 500 may comprise more, less or other units or modules which execute the functions of the network node 500 in the same manner as the units illustrated in FIG. 5.

It should be noted that FIG. 5 merely illustrates various functional units in the network node 500 in a logical sense. The functions in practice may be implemented using any suitable software and hardware means/circuits etc. Thus, the embodiments are generally not limited to the shown structures of the network node 500 and the functional units. Hence, the previously described exemplary embodiments may be realised in many ways. For example, one embodiment includes a computer-readable medium having instructions stored thereon that are executable by the control or processing unit for executing the method steps in the network node 500. The instructions executable by the computing system and stored on the computer-readable medium perform the method steps of the network node 500 as set forth in the claims.

The network node has the same possible advantages as the method performed by the network node. One possible advantage is that the reliability of broadcast message is increased using negative-acknowledgement messages instead of positive-acknowledgements. Another possible advantage is that the contention between positive-acknowledging devices, the total time spent in acknowledgment transmissions and radio planning for effective positive acknowledgments may be reduced. This may be especially useful when the broadcast group is quite large and the number of positive acknowledgments to be received is particularly larger than the number of negative acknowledgments. Still a possible advantage is that having negative acknowledgment instead of positive acknowledgment saves energy, reduces possible interference due to the simultaneous access in mediums where contention based access techniques are used and therefore reduces the latency in contention based systems by not increasing the medium occupancy. Further, positive acknowledgments activate processes in wireless devices that have decoded the message correctly but may not need to perform further actions which thus may be avoided.

According to an embodiment, the network node 400, 500 is further configured for receiving a negative acknowledgement, NACK, from at least one wireless device; and for re-transmitting the second message to that/those wireless device that transmitted a respective NACK to the network node, the second message being re-transmitted by means of broadcast, multicast or unicast.

According to yet an embodiment, the network node 400, 500 is further configured for applying a modulation and/or coding on the first message before it is transmitted by means of broadcast to the one or more wireless devices, the modulation and/or coding of the first message being more reliable than the modulation and/or coding of the second message.

According to still an embodiment, the network node 400, 500 is further configured for the first message comprises an indication of a length of a timer to be applied by the one or more wireless devices.

The wireless communication network may be based on one of the following technologies, WiFi, OFDM, CDMA, and TDMA as described above.

According to another embodiment, the second broadcast message comprises a command to be executed by the receiving wireless devices.

Embodiments herein also relate to a wireless device for receiving information from a network node, wherein the network node and the wireless device being operable in a wireless communication network. Exemplifying embodiments of such a method will now be described with reference to FIGS. 6 and 7. The wireless device has the same technical features, objects and advantages as the method performed by the wireless device. The wireless device will thus only be described in brief in order to avoid unnecessary repetition.

Figure 6:
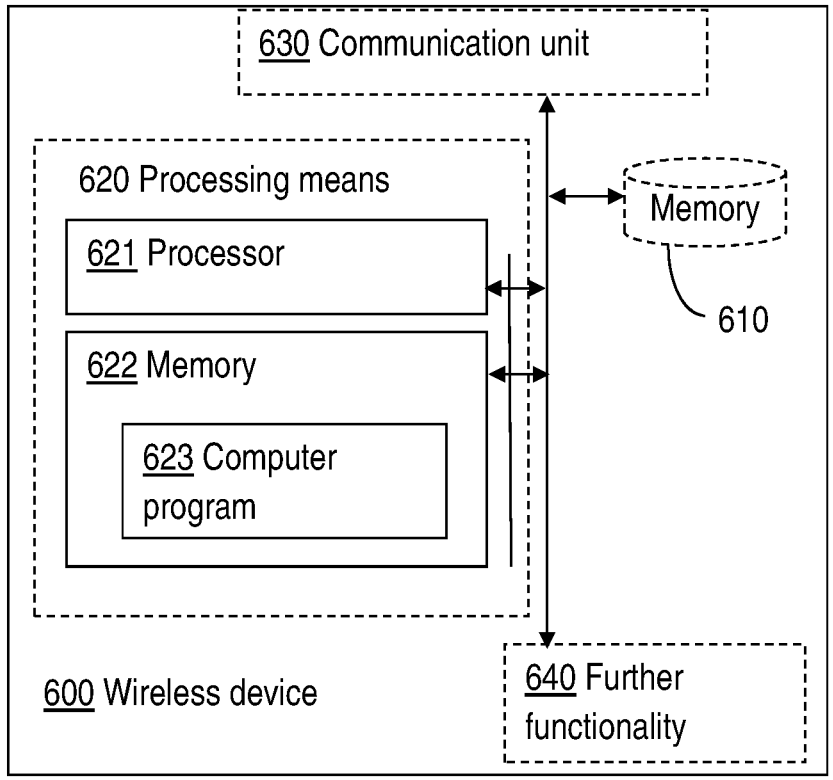
FIG. 6 is a block diagram of a wireless device for receiving information from a network node, according to an exemplifying embodiment.
Figure 7:
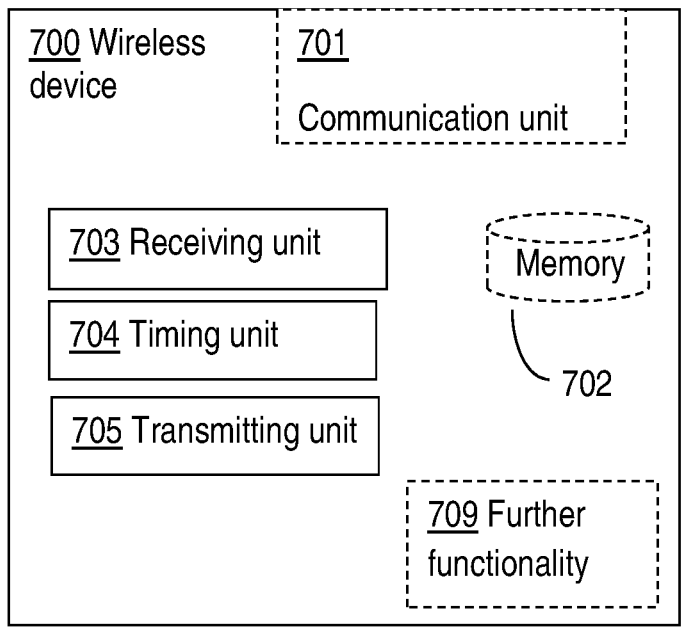
FIG. 7 is a block diagram of a wireless device for receiving information from a network node, according to another exemplifying embodiment.

FIGS. 6 and 7 illustrate the wireless device 600, 700 being configured for receiving, from the network node, a first message by means of broadcast indicating that a second message associated with the first message will be broadcasted after the transmission of the first message, the first message also indicating to the wireless device that feedback with regard to the second message is required should the second message not be received. The wireless device 600, 700 is configured for starting a timer; and when the timer expires before the second message is received, transmitting a NACK to the network node.

The wireless device may be realised on implemented in various ways. A first exemplifying realisation or implementation is illustrated in FIG. 6. FIG. 6 illustrates the wireless device comprising a processor 621 and memory 622, the memory comprising instructions, e.g. by means of a computer program 623, which when executed by the processor 621 causes the wireless device 600 to receive, from the network node, a first message by means of broadcast indicating that a second message associated with the first message will be broadcasted after the transmission of the first message, the first message also indicating to the wireless device that feedback with regard to the second message is required should the second message not be received. The memory further comprises instructions, which when executed by the processor 621 causes the wireless device 600 to start a timer; and when the timer expires before the second message is received, to transmit a NACK to the network node.

FIG. 6 also illustrates the wireless device 600 comprising a memory 610. It shall be pointed out that FIG. 6 is merely an exemplifying illustration and memory 610 may be optional, be a part of the memory 622 or be a further memory of the wireless device 600. The memory may for example comprise information relating to the wireless device 600, to statistics of operation of the wireless device 600, just to give a couple of illustrating examples. FIG. 6 further illustrates the wireless device 600 comprising processing means 620, which comprises the memory 622 and the processor 621. Still further, FIG. 6 illustrates the wireless device 600 comprising a communication unit 630. The communication unit 630 may comprise an interface through which the wireless device 600 communicates with other nodes or entities of the wireless communication network as well as other communication units. FIG. 6 also illustrates the wireless device 600 comprising further functionality 640. The further functionality 640 may comprise hardware of software necessary for the wireless device 600 to perform different tasks that are not disclosed herein.

An alternative exemplifying realisation, or implementation, of the wireless device is illustrated in FIG. 7. FIG. 7 illustrates the wireless device 700 comprising a receiving unit 703 for receiving, from the network node, a first message by means of broadcast indicating that a second message associated with the first message will be broadcasted after the transmission of the first message, the first message also indicating to the wireless device that feedback with regard to the second message is required should the second message not be received. FIG. 7 further illustrates the wireless device 700 comprising a timing unit 703 for starting a timer and a transmitting unit 704 for transmitting a NACK to the network node when the timer expires before the second message is received.

In FIG. 7, the wireless device 700 is also illustrated comprising a communication unit 701. Through this unit, wireless device 700 is adapted to communicate with other nodes and/or entities in the WLAN. The communication unit 701 may comprise more than one receiving arrangement. For example, the communication unit 701 may be connected to both a wire and an antenna, by means of which the wireless device 700 is enabled to communicate with other nodes and/or entities in the wireless communication network. Similarly, the communication unit 701 may comprise more than one transmitting arrangement, which in turn is connected to both a wire and an antenna, by means of which the wireless device 700 is enabled to communicate with other nodes and/or entities in the wireless communication network. The wireless device 700 further comprises a memory 702 for storing data. Further, the wireless device 700 may comprise a control or processing unit (not shown) which in turn is connected to the different units 703-705. It shall be pointed out that this is merely an illustrative example and the wireless device 700 may comprise more, less or other units or modules which execute the functions of the wireless device 700 in the same manner as the units illustrated in FIG. 7.

It should be noted that FIG. 7 merely illustrates various functional units in the wireless device 700 in a logical sense. The functions in practice may be implemented using any suitable software and hardware means/circuits etc. Thus, the embodiments are generally not limited to the shown structures of the wireless device 700 and the functional units. Hence, the previously described exemplary embodiments may be realised in many ways. For example, one embodiment includes a computer-readable medium having instructions stored thereon that are executable by the control or processing unit for executing the method steps in the wireless device 700. The instructions executable by the computing system and stored on the computer-readable medium perform the method steps of the wireless device 700 as set forth in the claims.

The wireless device has the same possible advantages as the method performed by the wireless device. One possible advantage is that the reliability of broadcast message is increased using negative-acknowledgement messages instead of positive-acknowledgements. Another possible advantage is that the contention between positive-acknowledging devices, the total time spent in acknowledgment transmissions and radio planning for effective positive acknowledgments may be reduced. This may be especially useful when the broadcast group is quite large and the number of positive acknowledgments to be received is particularly larger than the number of negative acknowledgments. Still a possible advantage is that having negative acknowledgment instead of positive acknowledgment saves energy, reduces possible interference due to the simultaneous access in mediums where contention based access techniques are used and therefore reduces the latency in contention based systems by not increasing the medium occupancy. Further, positive acknowledgments activate processes in wireless devices that have decoded the message correctly but may not need to perform further actions which thus may be avoided.

According to an embodiment, the wireless device 600, 700 is further configured for receiving the second message from the network node after the timer has expired, the second message being received by means of broadcast, multicast or unicast.

According to yet an embodiment, the wireless device 600, 700 is further configured for stopping the timer when the second message is received before the timer expires.

According to still an embodiment, the first message comprises an indication of the length of the timer that the wireless device should apply for the timer.

According to another embodiment, the length of the timer is preconfigured in the wireless device.

The wireless communication network may be based on one of the following technologies, WiFi, OFDM, CDMA, and TDMA as described above.

According to yet an embodiment, the second broadcast message comprises a command to be executed by the wireless device(s).

Figure 8:
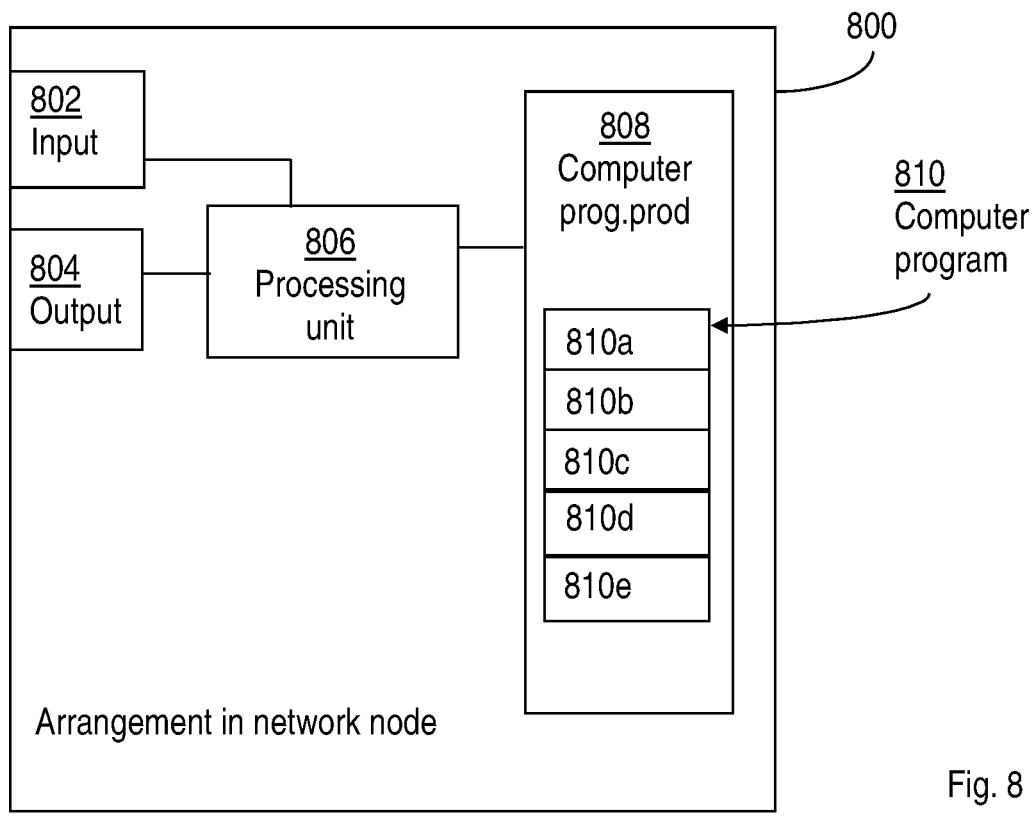
FIG. 8 is a block diagram of an arrangement in a network node for providing information to one or more wireless devices, according to an exemplifying embodiment.

FIG. 8 schematically shows an embodiment of an arrangement 800 in a network node 500. Comprised in the arrangement 800 in the network node 500 are here a processing unit 806, e.g. with a Digital Signal Processor, DSP. The processing unit 806 may be a single unit or a plurality of units to perform different actions of procedures described herein. The arrangement 800 of the network node 500 may also comprise an input unit 802 for receiving signals from other entities, and an output unit 804 for providing signal(s) to other entities. The input unit and the output unit may be arranged as an integrated entity or as illustrated in the example of FIG. 5, as one or more interfaces 501.

Furthermore, the arrangement in the network node 500 comprises at least one computer program product 808 in the form of a non-volatile memory, e.g. an Electrically Erasable Programmable Read-Only Memory, EEPROM, a flash memory and a hard drive. The computer program product 808 comprises a computer program 810, which comprises code means, which when executed in the processing unit 806 in the arrangement 800 in the network node 500 causes the network node to perform the actions e.g. of the procedure described earlier in conjunction with FIGS. 1a-1c.

The computer program 810 may be configured as a computer program code structured in computer program modules 810a-810e. Hence, in an exemplifying embodiment, the code means in the computer program of the arrangement 800 in the network node comprises a transmitting unit, or module, for transmitting a first message by means of broadcast indicating that a second message associated with the first message will be broadcasted after the transmission of the first message, the first message also indicating to the one or more wireless devices that feedback with regard to the second message is required should the second message not be received; and for transmitting the second message by means of broadcast.

The computer program modules could essentially perform the actions of the flow illustrated in FIG. 1a, to emulate the network node 500. In other words, when the different computer program modules are executed in the processing unit 806, they may correspond to the unit 503 of FIG. 5.

Figure 9:
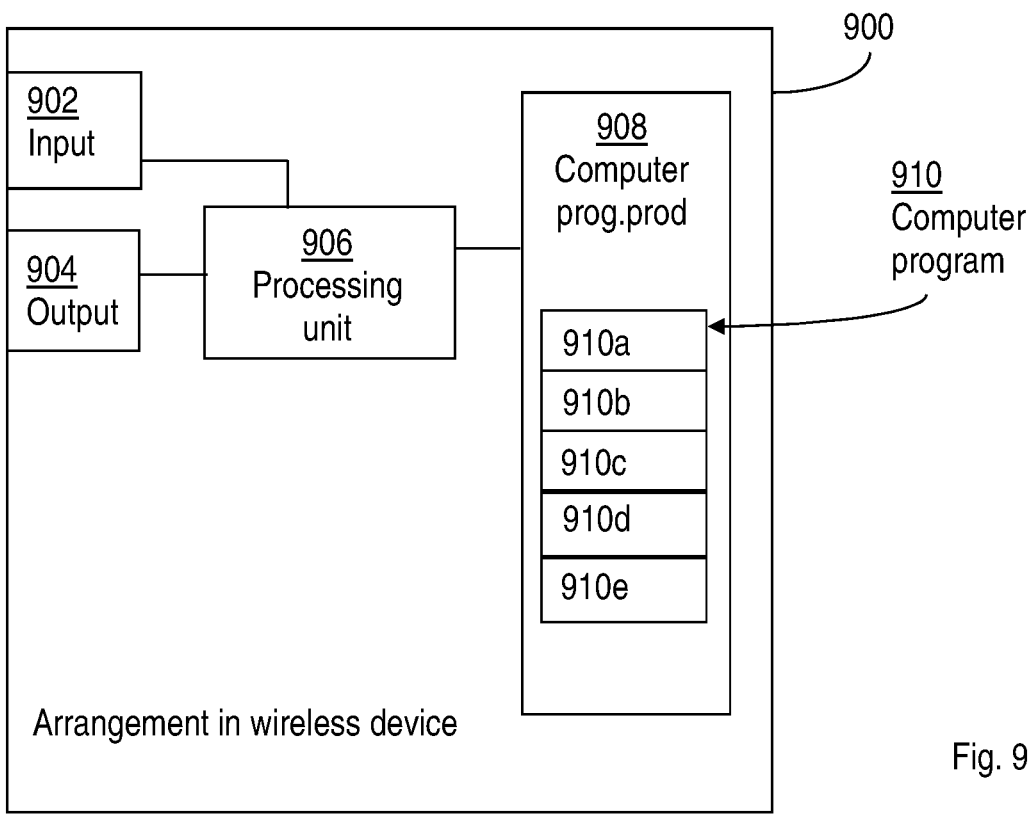
FIG. 9 is a block diagram of a wireless device for receiving information from a network node, according to an exemplifying embodiment.

FIG. 9 schematically shows an embodiment of a wireless device 900. Comprised in the wireless device 900 are here a processing unit 906, e.g. with a Digital Signal Processor. The processing unit 906 may be a single unit or a plurality of units to perform different actions of procedures described herein. The wireless device 900 may also comprise an input unit 902 for receiving signals from other entities, and an output unit 904 for providing signal(s) to other entities. The input unit and the output unit may be arranged as an integrated entity or as illustrated in the example of FIG. 7, as one or more interfaces 701.

Furthermore, the wireless device 900 comprises at least one computer program product 908 in the form of a non-volatile memory, e.g. an Electrically Erasable Programmable Read-Only Memory, EEPROM, a flash memory and a hard drive. The computer program product 908 comprises a computer program 910, which comprises code means, which when executed in the processing unit 906 in the arrangement 900 in the wireless device causes the wireless device to perform the actions e.g. of the procedure described earlier in conjunction with FIGS. 2a and 2b.

The computer program 910 may be configured as a computer program code structured in computer program modules 910a-910e. Hence, in an exemplifying embodiment, the code means in the computer program of the arrangement 900 in the wireless device comprises a receiving unit, or module, for receiving, from the network node, a first message by means of broadcast indicating that a second message associated with the first message will be broadcasted after the transmission of the first message, the first message also indicating to the wireless device that feedback with regard to the second message is required should the second message not be received. The code means in the computer program of the arrangement 900 in the wireless device further comprises a timing unit, or module, for starting a timer and a transmitting unit, or module, for transmitting a NACK to the network node when the timer expires before the second message is received.

The computer program modules could essentially perform the actions of the flow illustrated in FIGS. 2a and 2b, to emulate the wireless device 700. In other words, when the different computer program modules are executed in the processing unit 906, they may correspond to the units 703-705 of FIG. 7.

Although the code means in the respective embodiments disclosed above in conjunction with FIGS. 5 and 7 are implemented as computer program modules which when executed in the respective processing unit causes the network node and the wireless device respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node and the wireless device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node for providing information to one or more wireless devices, the network node and the one or more wireless devices being operable in a wireless communication network, the method comprising:
transmitting, by broadcast, a first message indicating that:
a second message associated with the first message will be broadcast after the transmission of the first message;
each of the wireless devices that does not correctly receive the second message within a time period should send feedback to the network node; and
each of the wireless devices that correctly receives the second message within the time period should not send feedback to the network node; and
transmitting, by broadcast, the second message.

2. The method according to claim 1, further comprising:
receiving a negative acknowledgement (NACK) from at least one wireless device in relation to the second message; and
re-transmitting the second message, to the at least one wireless device, by one of broadcast, multicast, and unicast.

3. The method of claim 2, further comprising receiving a positive acknowledgement (ACK), from the at least one wireless device, in relation to the retransmitted second message.

4. The method according to claim 1, further comprising:
applying a modulation and/or coding to the first message before it is transmitted; and
applying a further modulation and/or coding to the second message before it is transmitted, wherein the modulation and/or coding applied to the first message is more reliable than the further modulation and/or coding applied to the second message.

5. A method performed by a wireless device for receiving information from a network node, the network node and the wireless device being operable in a wireless communication network, the method comprising:
receiving, from the network node via broadcast, a first message indicating that:
a second message associated with the first message will be broadcast after the transmission of the first message;
the wireless device should send feedback to the network node if the wireless device does not correctly receive the second message within a time period; and
the wireless device should not send feedback to the network node if the wireless device correctly receives the second message within the time period;
starting a timer; and
based on not receiving the second message before the timer expires, transmitting a negative acknowledgement (NACK) to the network node.

6. The method according to claim 5, further comprising receiving the second message from the network node, after the timer has expired, by one of broadcast, multicast, and unicast.

7. The method of claim 6, further comprising transmitting a positive acknowledgement (ACK), to the network node, in relation to the second message received after the timer expired.

8. The method according to claim 5, further comprising, based on receiving the second message before the timer expires, stopping the timer.

9. A network node for providing information to one or more wireless devices, the network node and the wireless device(s) being operable in a wireless communication network, the network node comprising:
at least one processor; and
at least one memory storing computer-executable instructions that, when executed by the at least one processor, configure the network node to:
transmit, by broadcast, a first message indicating that:
a second message associated with the first message will be broadcast after the transmission of the first message;
each of the wireless devices that does not correctly receive the second message within a time period should send feedback to the network node; and
each of the wireless devices that correctly receives the second message within the time period should not send feedback to the network node; and
transmit, by broadcast, the second message.

10. The network node according to claim 9, wherein execution of the instructions further configures the network node to:

receive a negative acknowledgement (NACK) from at least one wireless device in relation to the second message; and re-transmit the second message, to the at least one wireless device, by one of broadcast, multicast, and unicast.

11. The network node of claim 10, wherein execution of the instructions further configures the network node to receive a positive acknowledgement (ACK), from the at least one wireless device, in relation to the retransmitted second message.

12. The network node according to claim 9, wherein execution of the instructions further configures the network node to:
apply a modulation and/or coding to the first message before it is transmitted; and
apply a further modulation and/or coding to the second message before it is transmitted, wherein the modulation and/or coding applied to the first message is more reliable than the further modulation and/or coding applied to the second message.

13. The network node according to claim 9, wherein the first message comprises an indication of a duration of a timer to be applied by the one or more wireless devices.

14. The network node according to claim 9, wherein the second message comprises a command to be executed by the receiving wireless devices.

15. A wireless device for receiving information from a network node, the network node and the wireless device being operable in a wireless communication network, the wireless device comprising:
at least one processor; and
at least one memory storing computer-executable instructions that, when executed by the at least one processor, configure the network node to:
receive, from the network node via broadcast, a first message indicating that:
a second message associated with the first message will be broadcast after the transmission of the first message;
the wireless device should send feedback to the network node if the wireless device does not correctly receive the second message within a time period; and
the wireless device should not send feedback to the network node if the wireless device correctly receives the second message within the time period;
start a timer; and
based on not receiving the second message before the timer expires, transmit a negative acknowledgement (NACK) to the network node.

16. The wireless device according to claim 15, wherein execution of the instructions further configures the wireless device to receive the second message from the network node, after the timer has expired, by one of broadcast, multicast, and unicast.

17. The wireless device of claim 16, wherein execution of the instructions further configures the wireless device to transmit a positive acknowledgement (ACK), to the network node, in relation to the second message received after the timer expired.

18. The wireless device according to claim 16, wherein execution of the instructions further configures the wireless device to stop the timer based on receiving the second message before the timer expires.

19. The wireless device according to claim 15, wherein the first message comprises an indication of a duration to be applied by the wireless device when starting the timer.

20. The wireless device according to claim 15, wherein a duration to be applied by the wireless device, when starting the timer, is preconfigured in the wireless device.

* * * * *